US008108913B2

(12) United States Patent
Weber et al.

(10) Patent No.: US 8,108,913 B2
(45) Date of Patent: Jan. 31, 2012

(54) ARCHITECTURE AND METHOD FOR CONTROLLING THE TRANSFER OF INFORMATION BETWEEN USERS

(75) Inventors: Eric Weber, Cormeilles En Vexin (FR); David Granjard, Houilles (FR); Fabien Alcouffe, Colombes (FR)

(73) Assignee: Thales (FR)

( * ) Notice: Subject to any disclaimer, the term of this patent is extended or adjusted under 35 U.S.C. 154(b) by 519 days.

(21) Appl. No.: 12/158,937

(22) PCT Filed: Dec. 19, 2006

(86) PCT No.: PCT/EP2006/069950
§ 371 (c)(1),
(2), (4) Date: Feb. 9, 2009

(87) PCT Pub. No.: WO2007/071697
PCT Pub. Date: Jun. 28, 2007

(65) Prior Publication Data
US 2010/0005510 A1    Jan. 7, 2010

(30) Foreign Application Priority Data
Dec. 23, 2005   (FR) ...................... 05 13220

(51) Int. Cl.
*G06F 7/04*    (2006.01)
(52) U.S. Cl. ........... 726/4; 726/1; 726/2; 726/3; 726/10; 726/11; 726/12; 726/13; 726/14; 709/227; 709/228; 709/229; 709/223; 709/224; 709/225; 713/175

(58) Field of Classification Search ........................ 726/4
See application file for complete search history.

(56) References Cited

U.S. PATENT DOCUMENTS

| 5,802,178 | A  | * | 9/1998 | Holden et al. ................. 713/151 |
| 5,828,832 | A  | * | 10/1998 | Holden et al. ................... 726/12 |
| 6,018,760 | A  | * | 1/2000 | Oishi et al. ..................... 709/204 |
| 6,480,963 | B1 |   | 11/2002 | Tachibana |
| 7,624,180 | B2 | * | 11/2009 | Holden et al. ................. 709/225 |
| 2004/0039906 | A1 | * | 2/2004 | Oka et al. ....................... 713/156 |
| 2004/0196843 | A1 | * | 10/2004 | Zinin ............................. 370/389 |
| 2006/0080554 | A1 | * | 4/2006 | McDonald et al. ........... 713/189 |
| 2006/0129809 | A1 | * | 6/2006 | Battagin et al. ............... 713/166 |
| 2007/0038719 | A1 | * | 2/2007 | Brown et al. .................. 709/207 |
| 2007/0101400 | A1 | * | 5/2007 | Freeman et al. ................... 726/2 |
| 2007/0143604 | A1 | * | 6/2007 | Arroyo et al. ................. 713/167 |
| 2009/0323703 | A1 | * | 12/2009 | Bragagnini et al. ........... 370/401 |

OTHER PUBLICATIONS

Chapman and Zwicky: "Building Internet Firewalls"; 1995, O'Reilly & Associates, USA, XP002406306; pp. 4-5, p. 131-134, pp. 168-171 and pp. 379-381.

* cited by examiner

*Primary Examiner* — Edan Orgad
*Assistant Examiner* — Canh Le
(74) *Attorney, Agent, or Firm* — Lowe Hauptman Ham & Berner, LLP

(57) ABSTRACT

A system and method for marking and controlling the transfer of information between several users (2i, 9i). An authority (3) marks information to be transmitted. A directory (4) or device containing the certificates of all users as well as the certificates of all the components of the architecture. A security office (5) is used to, a key management device (6a) and a privilege management device (6b).

1 Claim, 1 Drawing Sheet

ARCHITECTURE AND METHOD FOR CONTROLLING THE TRANSFER OF INFORMATION BETWEEN USERS

CROSS-REFERENCE TO RELATED APPLICATIONS

The present Application is based on International Application No. PCT/EP2006/069950, filed on Dec. 19, 2006, which in turn corresponds to French Application No. 05/13220 filed on Dec. 23, 2005, and priority is hereby claimed under 35 USC §119 based on these applications. Each of these applications are hereby incorporated by reference in their entirety into the present application.

FIELD OF THE INVENTION

The invention notably concerns a system architecture and method for controlling the transfer of information between several users, according to the level of sensitivity of the information.

It applies, notably, to the control of the flow of information leaving a first network having a given confidentiality level to a second network having a lower confidentiality than that of the first network.

The word "labeling" will be used for denoting a solution for marking information or numerical objects that notably makes it possible:

To control access to objects according to the rights of users in accordance with a security policy, defined for example by a person in charge of a system, To filter objects transmitted between entities with different security levels, by ensuring that only authorized information passes.

SUMMARY OF THE INVENTION

The invention relates to a method for marking and controlling the transfer of information between several users, characterized in that is comprises at least the following steps:

A user issues an application request for information labeling,

The labeling application is transmitted to a labeling authority on which the user is authenticated, The labeling authority:
  cleans the transmitted information according to a defined security policy,
  verifies from a directory the right of the user to handle the information,
  associates in a reliable manner the information+label couple, by using a cryptographic resource, The labeling authority then transmits the information+label couple to the user for verification of non-corruption of the labeled information and, after verification, it transmits this couple to a security office which registers the object (information+label), The security office then delivers the information to users who make application for it according to the information contained in the label, the rights of the authenticated applicant user, and according to a given policy. The security policy may be defined by a network administrator.

The transfer of information is carried out, for example, between clients of a first network with a given confidentiality level, and clients of a second network with a lower confidentiality level than that of the first network and comprises at least the following steps:

a filtering gateway verifies the integrity of the couple (information and label) and the identity of the user and transfers the file if the security policy authorizes it, the labeled information is stored on the second network, when a client issues a request for the recovery of information, a security office verifies, according to the rights of the client and in relation to the information of the label and the security policy, whether delivery of the information is authorized.

The invention also relates to a system for marking and controlling the transfer of information between several users, characterized in that it comprises at least the following elements:

An authority for marking (or applying a label to) information to be transmitted, A directory or device containing the certificates of all users as well as the certificates of all the components of the architecture, A security office, A key management device and a privilege management device.

The system may comprise at least two networks, a first network on which the first users are connected and a second network on which one or more second users are connected, the confidentiality level of the second network that has a lower confidentiality level than that of the first network and may include a filtering gateway disposed between the two networks.

The present invention notably makes it possible to deliver information only to persons authorized to receive it. It ensures that information is authorized to leave the reliability network within the framework of the transfer of information between networks.

The invention enables the security level of the solution to be increased while reducing the possibilities of hidden channels on the flow, the method processing objects, information and not flows.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, if figures of the accompanying drawings, wherein elements having the same reference numeral designations represent like elements throughout and wherein.

DETAILED DESCRIPTION OF THE INVENTION

Figure 1:
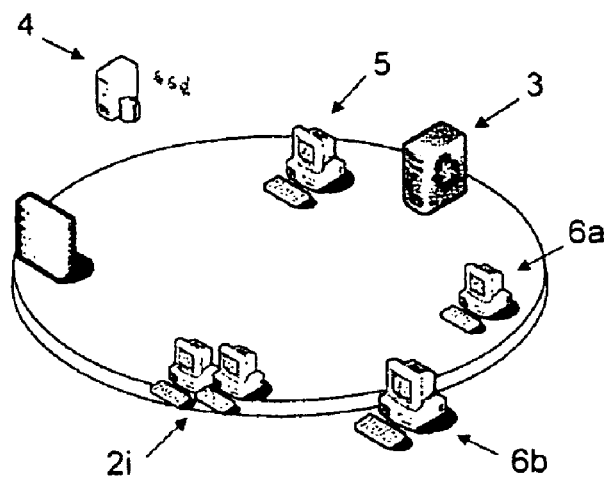
FIG. 1 is an example of an assembly of elements employed in the system according to the invention.

FIG. 1 represents an assembly of elements employed according to the invention, for the transfer of information between several users forming part of one or more different networks, the transmitted information having a confidential nature.

Information is, for example, a numerical object, an electronic message, a file, etc.

The architecture comprises, for example, one or more clients 2i, a labeling authority 3, a directory 4, a security office 5, a device 6a and a device 6b shown schematically in a common block on the figure, of which the functions are described hereinafter.

A client 2i terminal prepares application requests for labeling information. The terminal also includes suitable means for verifying information after labeling.

The labeling authority 3 has notably for its function the application of labels on all objects or information of users of the system. It also includes a cryptographic resource in order to associate the information+label couple in a reliable manner.

The device 6a is an infrastructure having notably the function of key management. It generates key certificates of the confidence network for all those participating in the system, the clients, and devices employed in the method according to the invention.

The device 6b is a privilege management infrastructure. It enables notably the rights of various participants in the system to be managed. It generates, for example, privilege certificates.

The directory 4 stores, notably, the creations of the devices 6a and 6b, usually known as KMI (key management infrastructure) and PMI (privilege management infrastructure).

Figure 2:
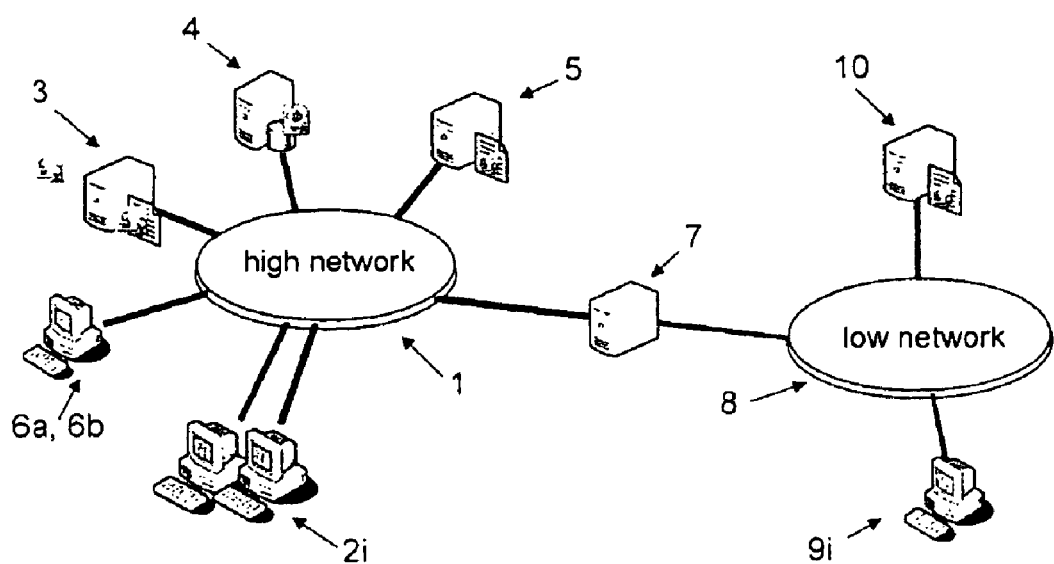
FIG. 2 is an example of a system architecture according to the invention.

The method and the system according to the invention apply, for example, for flows leaving a first network with a given confidence level to a second network with a lower confidence level than that of the first network. FIG. 2 describes an architecture for such a system.

The system comprises, for example, a first network with a high sensitivity 1 called "the high network" on which the various elements are connected such as: one or more clients 2i, a labeling authority 3, a directory 4, a security office 5, a device 6a and a device 6b shown schematically on a common block on the figure, of which the functions are described hereinafter.

The high network 1 is connected by a filtering gateway 7 to a second low sensitivity network 8, called <<the low network>> since it has a confidence level lower than that of the high network. One or more clients 9i and a security office 10 are connected to the low sensitivity network.

The filtering gateway 7 has notably the function of verifying that the information may or may not pass from one network to another. It ensures the interconnection of networks. It filters, for example, the information level and network protocols, etc.

The solution employed in this example rests on a directory 4 that contains the certificates of all users as well as the certificates for all components for the architecture, for identifications.

The system is implemented, for example, in the manner described hereinafter.

An applicant or client 2i of the high sensitivity network 1 who desires to transfer information to the low sensitivity network 8, issues a request to the labeling authority for applying a label to the information. In order to create an information labeling application, the applicant or client 2i completes a form comprising an assembly of fields. This is carried out for example on the client terminal itself. The fields may contain data associated with the information to be transmitted such as the name of the person issuing the information, the classification level for this information, the recipient of the information, etc.

The application is then transmitted to the labeling authority 3. The transmission of information (object+form), between the labeling authority and the applicant client is protected. The protection of exchanges between the two networks is carried out by a method of authentication and encryption known to a person skilled in the art, such as for example the secure socket layer protocol SSL.

On receiving the information, the labeling authority carries out various steps, for example:
  It "cleans" the transmitted information (suppression of hidden channels) according to the security policy defined by the user organization responsible for security. The hidden channels are for example means that enable information to be transferred without the knowledge of the user; for example the hidden fields of Word files marketed by Microsoft, not seen by the user when opening a file with Word.
  It verifies with the directory 4 the right of the user 2i for labeling information,
  It utilizes its cryptographic resource for associating, in a secure manner, by sealing for example, the information+label couple.

The new object (information+label) is then retransmitted to the user or applicant client 2i for verification and to the "security office server" 5 capable of storing and delivering labeled information to other users. Verification consists, for example, of checking that the information has not been corrupted by cleaning and applying the label.

The safety office 5 records a copy of the object (information and label), and then transmits the labeled information to a security gateway, towards the outside.
  At the time of passage, the filtering gateway 7 verifies the sealing and integrity of the couple (information+label), identifies the user and transfers the file if the security policy allows it.
  The information is stored on the security office server of the low sensitivity network.

When a client 9i of the low network asks the security office server to deliver information to him, the security office 10 verifies, according to the rights of the user with regard to the label associated with the information and security policy, whether it may deliver the information to him.

It is possible to use the XML standard as a container for the labeled information. Metadata require taking XML standards into account.

The system and method described above apply, for example, to the following fields: pharmaceutical networks, research, banking networks, and all systems in which it is desired to transfer information from a network having one confidence level to a network with a lower confidence level.

Without departing from the scope of the invention, a centralized labeling authority may be used or one distributed over all or some client terminals.

It will be readily seen by one of ordinary skill in the art that the present invention fulfills all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of marking and controlling a transfer of information between several users within in a system that includes a labeling authority device for transmitting information, a directory or device containing certificates of all the users and certificates of all components of an architecture of the system, a security office, a key management device, and a privilege management device; said method comprising:

issuing a labeling application request by a user for information labeling, transmitting the labeling application request to the labeling authority device on which the user is authenticated, providing an couple including information and label by the labeling authority device, cleaning the information to be transmitted according to a defined security policy by the labeling authority device, verifying from the directory rights of the authenticated user to handle the information by the labeling authority device, associating the information with the labeling application in a secure manner to define the couple, by using a cryptographic resource of the labeling authority device, transmitting the couple by the labeling authority device to the user for verification of non-corruption of the labeled information, after verification, transmitting the couple to the security office which registers a copy of a new object or the couple, and delivering the couple by the security office to another user according to the information contained in the labeling application, the rights of the authenticated user, and according to a given policy, wherein the transfer of information is carried out between a first user of a first network with a given confidentiality level, and a second user of a second network with a lower confidentiality level than that of the first network, said method further comprises:

verifying an integrity of the couple and an identity of the first user by a filtering gateway, and transferring a hidden file by the filtering gateway if the security office authorize the transferring, the couple is stored on the second network, and when the second user issues a request to recover the transmitted information, the security office verifies, according to rights of the first user and in relation to the transmitted information and the security policy, whether a delivery of the transmitted information is authorized.

\* \* \* \* \*